United States Patent [19]
Isenberg

[11] Patent Number: 5,601,937
[45] Date of Patent: Feb. 11, 1997

[54] HYDROCARBON REFORMER FOR ELECTROCHEMICAL CELLS

[75] Inventor: Arnold O. Isenberg, Pittsburgh, Pa.

[73] Assignee: Westinghouse Electric Corporation, Pittsburgh, Pa.

[21] Appl. No.: 378,298

[22] Filed: Jan. 25, 1995

[51] Int. Cl.$^6$ ..................................................... H01M 8/04
[52] U.S. Cl. ................................................ 429/17; 429/20
[58] Field of Search .................................. 429/17, 19, 20; 208/137

[56] References Cited

U.S. PATENT DOCUMENTS

| | | | |
|---|---|---|---|
| Re. 28,792 | 4/1976 | Ruka et al. ............................... | 204/1 T |
| 3,982,962 | 9/1976 | Bloomfield .................................. | 429/19 |
| 4,365,006 | 12/1982 | Baker ...................................... | 429/20 X |
| 4,395,468 | 7/1983 | Isenberg .................................... | 429/31 |
| 4,412,895 | 11/1983 | Lu ........................................... | 204/129 |
| 4,463,063 | 7/1984 | Adlhart .................................... | 429/19 |
| 4,474,862 | 10/1984 | Buzzelli et al. ......................... | 429/17 |
| 4,490,444 | 12/1984 | Isenberg .................................... | 429/31 |
| 4,745,038 | 5/1988 | Brown ...................................... | 429/27 |
| 4,751,152 | 6/1988 | Zymboly .................................... | 429/31 |
| 4,983,471 | 1/1991 | Reichner et al. ......................... | 429/19 |
| 5,143,800 | 9/1992 | George et al. ............................. | 429/20 |
| 5,284,717 | 2/1994 | Yamase et al. ......................... | 429/19 X |

Primary Examiner—Stephen Kalafut

[57] ABSTRACT

An apparatus for and a method of continuously supplying a conditioned fuel, such as CO and $H_2$, to an electrochemical generator such as a high temperature solid oxide electrolyte, fuel cell generator (SOFC), for electrochemical reactions and continually regenerating a hydrocarbon reformation catalyst by providing at least two iron metal/iron oxide beds. At least one bed, a reformation bed, is mainly in the iron oxide (FeO) condition and incoming hydrocarbon feed fuel gas, such as natural gas, will be reformed or conditioned at a temperature of about 600° C. to 800° C. on the iron oxide to CO and $H_2$ which represents the fuel to be fed to the fuel cells of the electrochemical generator, thereby reducing iron oxide to iron metal (Fe). While the FeO reformer bed is being reduced to Fe, the at least one other bed, an oxidation bed, which previously served as a reformer bed mainly in the iron metal condition (Fe) is oxidized at a temperature of about 600° C. to 800° C. to mainly FeO form with generator spent fuel gases, thereby oxidizing iron to iron oxide and also producing some additional conditioned fuel gas. The beds can be operated concurrently or sequentially, and when each bed becomes substantially exhausted, it is switched over in function to the other mode of operation.

6 Claims, 3 Drawing Sheets

HYDROCARBON REFORMER FOR ELECTROCHEMICAL CELLS

FIELD OF THE INVENTION

The invention relates to the field of reformation of hydrocarbon gases. More particularly the invention relates to hydrocarbon gas reformers which are used to condition fuels for electrochemical fuel cell generators, such as a high temperature, solid oxide electrolyte fuel cell generators. The invention is even more particularly directed to an apparatus and for a method of providing a continuous supply of conditioned fuel gas to an electrochemical fuel cell generator by using a hydrocarbon reformer composed of a minimum of two beds of which one contains an iron oxide and the other an iron metal. In one aspect, a portion of the spent gases from the fuel cell generator exhaust flow through an iron metal bed which forms iron oxide and a fresh supply of conditioned fuel gas for fuel cell generator operations. In another aspect, a portion of the spent gases from the fuel cell generator exhaust together with hydrocarbon fuel gases flow through an iron oxide bed which leads to the reformation of the hydrocarbon fuel gas to also supply a fresh supply of conditioned fuel gas for fuel cell generator operations. Switching of the gas supplies from one bed to the other allows for a continuous hydrocarbon reformation and fuel supply to the electrochemical fuel cell generator.

BACKGROUND OF THE INVENTION

High temperature, solid oxide electrolyte fuel cells and multi-cell generators and configurations thereof designed for converting chemical energy into direct current electrical energy at temperatures typically in the range of 600° C.–1200° C. are well known and taught, for example, in my U.S. Pat. Nos. 4,395,468 (Isenberg) and 4,490,444 (Isenberg). A multi-cell generator generally contains a plurality of parallel, axially elongated, electrically connected electrochemical fuel cells, each fuel cell having an exterior fuel electrode, an interior air electrode, a solid oxide electrolyte sandwiched between the electrodes, and gaseous oxidant and gaseous hydrocarbon fuel entry means. The hydrocarbon fuel prior to contacting the fuel cell is reformed to hydrogen ($H_2$) and carbon monoxide (CO) which is flowed parallel to the exterior surface of the fuel electrode. The reformed hydrocarbon fuel is electrochemically oxidized by an oxidant such as oxygen ($O_2$) or air which is flowed over to the interior surface of the air electrode. Direct current electrical energy is generated. Exhaust gases such as a portion of the spent fuel are combusted together with spent oxidant in a combustion chamber and vented as hot combusted exhaust gas. Another portion of the spent fuel is recirculated and combined with fresh hydrocarbon feed fuel to provide the oxygen species for hydrocarbon reformation and conditioning of the hydrocarbon feed fuel for electrical power generation reaction. Reformation of the incoming hydrocarbon feed fuel can be performed either inside or outside of the generator, although an internal reformer is preferred since reformation reactions are endothermic and are performed at a temperature close to that of the electrochemical fuel cell operation, typically between 600° C.–1200° C., and excess heat from the fuel cell generator can be usefully transferred to the reformer.

Natural gases comprising mostly methane ($CH_4$), with additions of ethane ($C_2H_6$), propane ($C_3H_8$), butane ($C_4H_{10}$) and the like, vaporized petroleum fractions such as naphtha and the like, and also alcohols, such as ethyl alcohol ($C_2H_5OH$) and the like, are appropriate oxidizable fuels for electrochemical reactions, and can be consumed in an electrochemical generator apparatus for generating electrical power, such as a high temperature, solid oxide electrolyte. However, the direct use of hydrocarbon fuels for generating electrical power can cause carbon deposition and soot formation on the fuel cells and other generator components at least partly from hydrocarbon cracking. Deposition of carbon on the generator components tends to damage and/or interfere with proper generator operations. Carbon can cause, inter alia, blocking of porous electrodes, create electrical shorts between electrodes, reduce insulation effectiveness, block, poison and mechanically destroy reformation catalysts, such as nickel supported on alumina in pellet form. Elimination of carbon deposition, therefore, requires conditioning of the hydrocarbon feed fuel gases by hydrocarbon reformation to noncarbonizing gas mixtures such as CO and $H_2$ together with $CO_2$ and $H_2O$, as the fuel for the fuel cells.

In the known high temperature, solid oxide electrolyte, fuel cell generators, the hydrocarbon feed fuel gas, such as natural gas, is generally mixed with $H_2O$ (steam) and/or $CO_2$, typically supplied from recirculated spent fuel gas comprising at least $H_2O$ and $CO_2$, and is passed together with hydrocarbon feed gases through an internal hydrocarbon reformer containing a packed bed of nickel (Ni) catalyst pellets at elevated temperatures typically at 500° to 700° C., to produce reformed fuel gas of $H_2$ and CO to be fed to the fuel electrode of the fuel cell. These conventional reformation catalysts have a limited life in that they tend to be deactivated. They are then discarded. The discarded catalyst must be replaced to continue to supply conditioned fuel to the fuel cell, which creates downtime and stops electrical power generation operations.

U.S. Pat. No. 5,143,800 (George, et all.) discloses a high temperature, solid oxide electrolyte, electrochemical fuel cell generator having a conventional internal hydrocarbon reformer containing a packed bed of Ni reforming catalyst supported on alumina pellets. The reforming catalyst consists of fine metal which is supported on aluminum oxide as catalyst carrier, this is the preferred catalyst in hydrocarbon reformation. The reformer chamber is an elongated circular vessel having an annulus to provide recuperative heat transfer from the combusted exhaust gas exit channel and the spent fuel gas recirculation channel. In George, et al., a portion of spent fuel comprising at least $H_2O$ and also typically $CO_2$, $H_2$ and CO, is recirculated and combined with incoming fresh hydrocarbon feed fuel gas via a mixing nozzle in order to provide a homogeneous, reformable gas mixture which thereafter is fed through the reforming chamber containing the nickel catalyst pellet bed. In the presence of water vapor and carbon dioxide, and in contact with the reforming catalyst, the reformation of a gaseous hydrocarbon, for instance methane ($CH_4$) can proceed via the following reaction shown in Equation (1).

$$CH_4 + H_2O \xrightleftharpoons[\text{Catalyst}]{\text{High Temperature}} 3H_2 + CO \qquad (1)$$

In George, et al., the reforming chamber is characterized in that the incoming fresh hydrocarbon feed fuel gas has one or more by-pass channels controlled by valves so that the fresh hydrocarbon feed fuel can by-pass the aspirating portion and flow directly into the gaseous spent fuel recirculation channel, to control the amount of spent fuel gas (oxygen species) recirculated into the aspirator, in order to assure an appropriate O:C ratio or $H_2O$: gaseous hydrocarbon ratio is achieved under various operating conditions. U.S. Pat. No. 4,898,792 (Singh, et al.) discloses other typical hydrocarbon reforming catalyst materials used to condition the hydrocarbon fuels fed to a high temperature, solid oxide electrolyte fuel cell generator, such as Ni plus oxides of Mg, Ca, Al, Sr, Ce, or Ba and mixtures thereof. As described above, these catalysts have drawbacks in that they have a limited life and need be replaced, during electrical power generation operations.

It would be advantageous however to provide a hydrocarbon reformer, for example in a high temperature, solid oxide electrolyte, electrochemical fuel cell generator (SOFC), which continuously supplies a reformed fuel to the fuel cell generator and which is continually regenerated and reactivated during its lifetime in order to match the lifetime of a SOFC fuel cell generator (approx. 50,000 hours or more). It would also be advantageous to provide a reforming catalyst material for an internal hydrocarbon reformer of an electrochemical fuel cell generator which stores and supplies all the oxygen species for the hydrocarbon reformation reaction in order to eliminate the need for additional steam generation for the reformation process. The reforming medium in such a system of the invention is a mixture of iron oxide (FeO), and iron (Fe) and the system of the invention is characterized by a swing bed-reformation process having alternating iron metal and iron oxide beds (Fe/FeO).

In the swing bed-reformation process and apparatus of the invention, at least two Fe/FeO beds are used. One bed is mainly in the iron oxide (FeO) condition and incoming hydrocarbon feed fuel gas, such as natural gas, will be reformed to CO and $H_2$ which represents the fuel to be fed to the fuel cells, whereby FeO is reduced to Fe metal. While this FeO reformer bed is being reduced to Fe, the other Fe/FeO bed which previously served as a reformer bed is reoxidized from its mainly Fe-form to a mainly FeO-form with generator spent fuel gases. When the iron oxide of the FeO active reformer bed is substantially depleted of oxygen for reformation, the hydrocarbon fuel feed gas together with some spent fuel gas is switched over to the other bed which consists now mostly of FeO. This bed is now the active fuel reformer bed while the other one is reoxidized to be ready for another switch over. However, during reactivation with spent fuel gas this bed also produces some fuel ($H_2$ and CO).

SUMMARY OF THE INVENTION

It is an object of the invention to provide an electrochemical fuel cell generator apparatus having a thermally integrated hydrocarbon reformer system including alternating beds of Fe/FeO for continuous fuel conditioning for electrical power generation and continual reforming catalyst regeneration by reformation of hydrocarbon feed fuels on a FeO bed, where all the oxygen required for reformation is provided by $H_2O$ and $CO_2$ from spent fuel gases of a fuel cell generator. However, FeO is used as an intermediate carrier of the required oxygen for reformation in the form of two Fe/FeO beds, which are periodically charged and discharged of oxygen.

It is another object of the invention to provide a method of and apparatus for continuously supplying a fuel, such as CO and $H_2$, to an electrochemical generator apparatus.

It is yet another object of the invention to provide a method of and apparatus for continually reactivating a reforming catalyst for reuse in an electrochemical generator apparatus.

It is a feature of the invention to provide at least two Fe/FeO beds in an electrochemical generator apparatus, one bed being in a reformation mode containing iron oxide (FeO) and forming iron metal (Fe) and conditioned fuel gas for the generator from incoming hydrocarbon feed fuel gas and optionally incoming spent fuel gas, and the other bed being in an oxidation mode containing iron metal (Fe) and forming iron oxide (FeO) and fuel gas for the generator from incoming spent fuel gas, thereby continuously producing CO and $H_2$ conditioned fuel for the generator, while continually regenerating FeO reforming catalyst. Both beds are operated concurrently in two separate but periodically alternating modes and are provided with control means, such as valves, control the incoming feeds to the periodically alternating beds.

These and other objects, features and advantages are met in one aspect of the invention by a hydrocarbon reformation apparatus for conditioning a fuel gas for electrochemical conversion into electrical energy in an electrochemical fuel cell generator, characterized by: (A) at least one reformation reactor for producing a fuel gas, such as CO and $H_2$, for an electrochemical fuel cell generator, the at least one reformation reactor containing an iron oxide reforming catalyst bed, heating means for heating said iron oxide reforming catalyst bed, inlet means for introducing a hydrocarbon gas, such as natural gas comprising in most part $CH_4$, over said iron oxide bed for an effective time to substantially reduce and exhaust all of said iron oxide to an iron metal, and outlet means for discharging the fuel gas as fuel to the electrochemical fuel cell generator; (B) at least one oxidation reactor for producing a fuel gas, such as CO and $H_2$, for an electrochemical fuel cell generator and for regenerating an iron oxide reforming catalyst bed, the at least one oxidation reactor containing an iron metal bed, heating means for heating said iron metal bed, inlet means for introducing an oxidizing gas, such as $H_2O$ and $CO_2$, over said iron metal bed for an effective time to substantially oxidize and exhaust all of said iron metal to a regenerated iron oxide reforming catalyst, and outlet means for discharging the fuel gas as fuel to the electrochemical fuel cell generator; and, (C) control means, such as a valve, for switching over in function, one for the other, the at least one reformation reactor and the at least one oxidation reactor when their respective iron oxide and iron metal beds are substantially exhausted. The at least one reformation reactor and at least one oxidation reactor of the hydrocarbon reformation apparatus can be operated concurrently or sequentially.

These and other objects, features and advantages are met in another aspect of the invention by an electrochemical fuel cell generator apparatus including: (A) a generator chamber containing at least one fuel cell bundle, the bundle containing a plurality of parallel, elongated electrochemical fuel cells, each cell including an exterior fuel electrode, an interior air electrode, and a solid oxide electrolyte disposed between the fuel electrode and the air electrode; (B) an oxidant gas inlet connected to the interior of the fuel cells of the generator; (C) a fuel gas inlet connected to the generator fuel chamber; (D) a combustion chamber connected to the generator fuel chamber and fuel cell interior for combusting spent oxidant and a portion of spent fuel gas exiting from the generator chamber; (E) at least one exhaust gas channel connected to the combustion chamber for flowing hot combusted exhaust gas exiting from the combustion chamber; (F) at least one spent fuel gas recirculation channel connected to the generator chamber for recirculating a second portion of the spent fuel gas exiting from the generator chamber; and characterized by: (G) at least one reforming chamber connected to the generator chamber, the at least one reforming chamber including an iron oxide bed that is reduced periodically to iron metal, heating means for the iron oxide bed, and a fuel gas channel from the at least one reforming chamber connected to the fuel gas inlet to the generator chamber; (H) a fresh hydrocarbon gas inlet connected to the reforming chamber; (I) a mixing chamber connected to the fresh hydrocarbon gas inlet and the spent fuel gas recirculation channel for combining a portion of the spent fuel gas containing water vapor and carbon dioxide in the spent fuel gas recirculation channel with a fresh hydrocarbon feed gas prior to entering the reforming chamber; (J) at least one reforming catalyst oxidation chamber connected to the generator, the at least one reforming catalyst oxidation chamber including an iron metal bed, that is oxidized periodically to iron oxide, heating means for the iron metal bed, and a fuel gas channel from the at least one reforming catalyst oxidation chamber connected to the fuel gas inlet to the generator chamber; (K) a spent fuel inlet connected to the reforming catalyst oxidation chamber for introducing a portion of the spent fuel gas containing water vapor and carbon dioxide in the spent fuel recirculation channel to the reforming catalyst oxidation chamber; and, (L) control means connected to the at least one reforming chamber and the at least one reforming catalyst oxidation chamber, the control means interchanging, one for the other, the at least one reforming chamber and the at least one reforming catalyst oxidation chamber upon exhaustion of the iron oxide reforming catalyst bed and the iron metal bed in each chamber, respectively, to continuously reform a hydrocarbon gas and supply a fuel gas to a fuel cell generator for electrochemical conversion to electrical energy.

These and other objects, features and advantages are met in another aspect of the invention by a method of conditioning a fuel gas for electrochemical conversion to electrical energy in an electrochemical cell, characterized by the steps of: (A) providing a supply of a hydrocarbon gas; (B) passing the hydrocarbon gas in contact with at least one iron oxide reforming catalyst at a temperature of about 600° to 800° C. for an effective time to substantially reduce the iron oxide to iron metal to define an exhausted iron oxide reforming catalyst and to produce fuel gas containing $H_2$ and CO as fuel for an electrochemical cell; (C) providing a supply of oxidizing gas containing $H_2O$ (steam) and $CO_2$; (D) passing the oxidizing gas in contact with at least one other reforming catalyst in a reduced condition at a temperature of about 600° to 800° C. for an effective time to substantially oxidize all of the iron metal to an iron oxide to define a reactivated iron oxide reforming catalyst and to produce fuel gas containing $H_2$ and CO as fuel for an electrochemical cell; and, (E) repeating the preceding steps (A) to (D) while interchanging the position of reactivated iron oxide reforming catalyst with the exhausted iron oxide reforming catalyst.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE PREFERRED EMBODIMENTS OF THE INVENTION

The term "fuel electrode" as used herein means that electrode in contact with fuel, the term "air electrode" as used herein means that electrode in contact with air or oxygen. The term "spent" fuel, "spent" oxidant, or "spent" air as used herein means partially reacted, depleted fuel or reacted, depleted oxidant or air containing about 5 to 18% oxygen. The term "spent" fuel does not include the mixture of spent fuel combusted with spent oxidant or air, which mixture is defined herein as "combusted exhaust gas". The term "surrounds" as used herein means at least passing around and in contact with a major portion of the side of a vessel. The term "iron oxide" as used herein includes several iron oxide compositions, such as FeO, $Fe_2O_3$, $Fe_3O_4$, etc. For simplicity, I name here only FeO, since it is in chemical equilibrium with iron (Fe). However, the formation of other oxides of iron in the scheme of the invention is not excluded.

Figures 1, 1A:
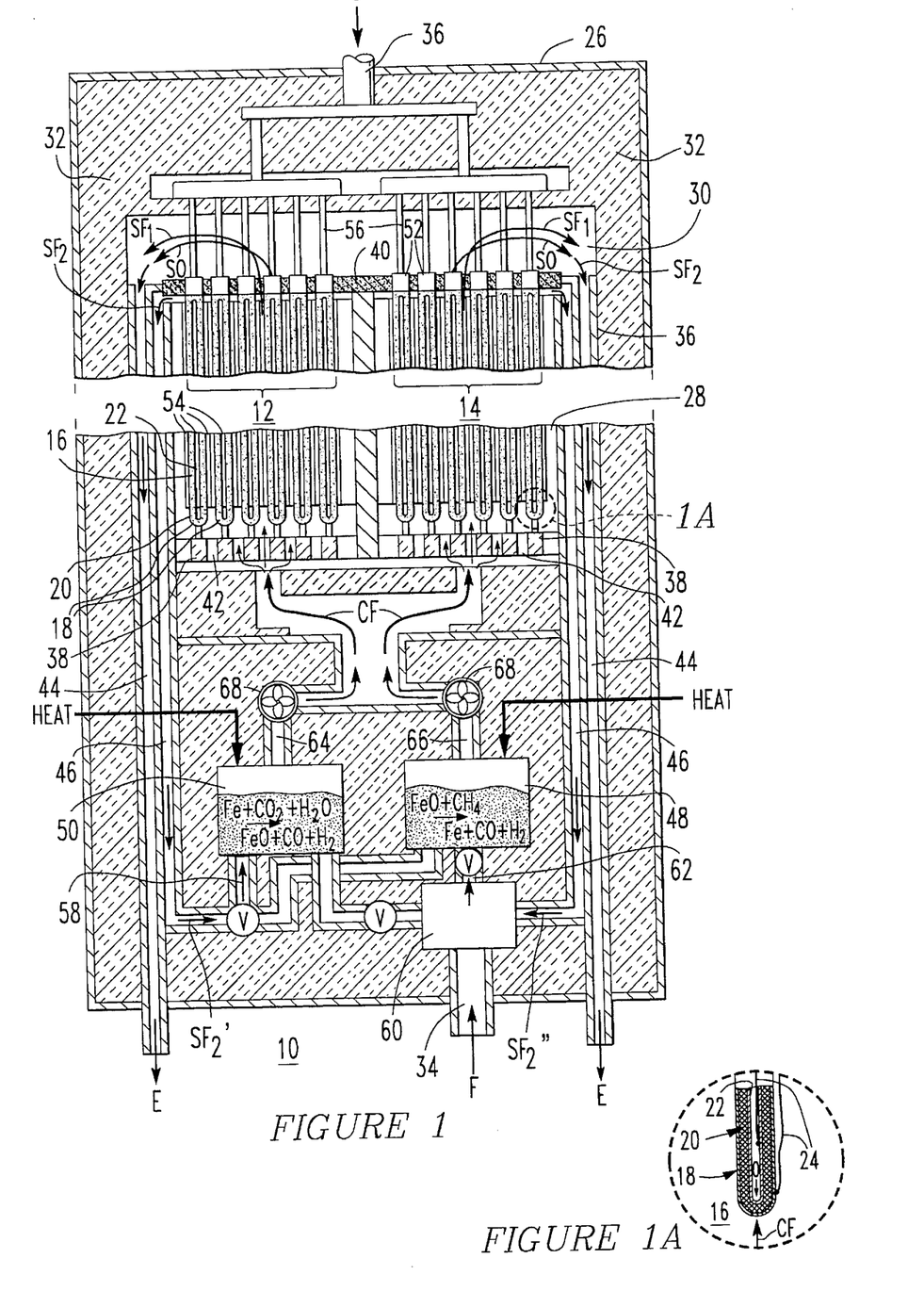
FIG. 1 is a sectional view of one embodiment of an electrochemical fuel cell generator apparatus of the invention, showing a bed of iron metal to be oxidized and a bed of iron oxide to be reduced to provide a continuous supply of fuel to the fuel cells by alternating between reactivation of the reforming catalyst in the oxidation bed and reformation of hydrocarbon feed fuel gases in the reformation bed.
FIG. 1A shows cell detail.

Referring to FIG. 1, an electrochemical cell apparatus or generator 10, such as a high temperature solid oxide electrolyte fuel cell generator, is shown containing two cell bundles 12 and 14, each bundle containing a plurality of parallel, axially elongated, tubular, electrochemical cells 16, such as high temperature solid oxide electrolyte fuel cells. It should be recognized that the foregoing description of the preferred tubular configuration is merely an example and should not be considered limiting in any manner. It is possible that other configurations for the electrochemical cell 16 could be used, for example, planar shaped cells. As shown in FIG. 1A, each cell has an exterior fuel electrode 18 covering its surface, an interior air electrode 22, and a solid oxide electrolyte 20 between the electrodes, as is well known in the art.

The electrochemical cell generator 10 is intended to operate with an interior temperature in a range of about 600° C. to about 1200° C. The preferred configuration is based upon a fuel cell system wherein a flowing gaseous conditioned fuel as shown as CF, such as hydrogen ($H_2$), carbon monoxide (CO) or unreformed hydrocarbon gases, is directed over the outside of the cell, axially, and an oxidant as shown as O, such as air or oxygen ($O_2$), is directed through the inside of the cell. Oxygen molecules pass through the porous electrically conductive air electrode structure 22 and are convened to oxygen ions which pass through the solid electrolyte 20 to combine with the fuel at the fuel electrode 18 to release electrons which are carried away via electrical leads 24 through an external load circuit (not shown) to the air electrode, thus generating a flow of electrical current. It should further be recognized that the location of the fuel and oxidant can be rearranged such that the oxidant flows over the outside of the cell and fuel flows through the inside of the cell by reversing the cell electrodes which is referred to as an "inverted" cell structure.

The air electrode 22 can be porous, doped ceramic of the perovskite family, for example, doped $LaMnO_3$, the solid electrolyte 20 can be gas-tight yttria or scandia stabilized zirconia, and the fuel electrode 18 can be porous nickel-zirconia cermet material. A porous calcia stabilized zirconia support (not shown) for the air electrode can optionally be used. A gas-tight interconnection (not shown) for electrically connecting adjacent fuel cells of doped $LaCrO_3$ on a segment of the air electrode can also be used. A more detailed description of the materials and construction of an exemplary electrochemical cell can be found in U.S. Pat. Nos. 4,490,444 (Isenberg), and 4,751,152 (Zymboly), which are herein incorporated by reference in their entireties.

An outer housing 26 generally surrounds the entire electrochemical generator 10. The outer housing is preferably made of metal such as steel. An inner housing 36 generally surrounds a plurality of chambers, including the generator chamber 28 and a combustion chamber 30. The inner housing is made of a high temperature oxidation resistant metal such as Inconel or similar material. Thermal insulation 32, such as, for example, low density alumina is contained within the outer housing 26. Penetrating the outer housing 26 and thermal insulation 32 are a fresh gaseous hydrocarbon feed fuel inlet 34, fresh hydrocarbon feed fuel such as natural gas (comprising in most part methane) being shown as F, and a gaseous oxidant feed inlet 36, the gaseous oxidant feed such as air or oxygen being shown as O. Ports can also be provided for electrical leads and the like (not shown).

The generator chamber 28 extends between a fuel distribution plate 38 and a porous barrier 40. Spaced between the fuel distribution plate 38 are entry ports 42 for the conditioned fuel being shown as CF to enter the generator chamber 28. The porous barrier 40 need not be a sealed structure. The porous barrier 40 is designed to allow a portion of the spent fuel gas to exit, the spent fuel gas being shown as $SF_1$, from the generator chamber 28, operating at about a pressure slightly above atmospheric, to the combustion chamber 30, operating at about a slightly lower pressure than in the generator chamber. This portion of the spent fuel $SF_1$ is combined with spent oxidant, the spent oxidant being shown as SO, to form a hot combusted exhaust gas which passes through a combusted exhaust channel 44, the hot combusted exhaust gas being shown as E. A second portion of the spent fuel gas being shown as $SF_2$ is recirculated in a spent fuel recirculation channel 46 to either combine with fresh gaseous hydrocarbon feed fuel F to facilitate hydrocarbon fuel reforming in at least one reformation chamber 48 or to be fed to at least one oxidation chamber 50 before passing over the fuel electrode 18 in the generator chamber 28 as conditioned fuel CF.

The elongated electrochemical cells 16, such as, high temperature, solid oxide electrolyte fuel cells, extend between the combustion chamber 30 and the fuel distribution plate 38. The electrochemical cells have open ends 52 in the combustion chamber 30, and closed ends in the generator chamber 28 near the fuel distribution board 38. Each individual cell typically generates approximately 1 volt on open circuit, and a plurality of electrochemical cells are electrically connected through conducting felts 54, usually nickel fiber metal, preferably in a series-parallel rectangular array as described in U.S. Pat. No. 4,395,468 (Isenberg), which is herein incorporated by reference in its entirety, to obtain a desired relationship of output voltage to current capacity.

By way of example, during operation of the electrochemical generator 10, a gaseous oxidant O, such as air or oxygen, is fed through the oxidant feed inlet 36, and enters oxidant feed conduits 56 at a temperature of about 500° C. to 700° C., and a pressure above atmospheric. The oxidant feed O can optionally be heated by conventional means (not shown) prior to penetrating the housing, such as by a heat exchanger coupled with a blower. The oxidant flowing within the conduits 56 is passed in heat communication through the combustion chamber 30, where the oxidant is further heated to a temperature of about 800° C. to 900° C. by the sensible heat released from the combusted exhaust gas E. The oxidant flows through the length of the oxidant circuit, through the oxidant conduits 56 which extend down the inside length of the electrochemical cell 16, being further heated to about 1,000° C. by virtue of absorbing most of the heat generated during the electrochemical reaction in the generator chamber 28. A smaller fraction of the heat is absorbed by the fuel.

The oxidant is then discharged into the closed end, i.e., the bottom, of the electrochemical cells 16. The oxidant within the electrochemical cells reverses direction, and electrochemically reacts at the inner air electrode 22 along the inside of the active length of the cells 16, being depleted somewhat in oxygen as it approaches the open ends 52 of the electrochemical cells 16. The depleted or spent oxidant SO is then discharged into the combustion chamber 30 through the open cell ends 52, where it combusts with depleted or spent fuel $SF_1$, part of the total of which passes through porous barrier 40, to form combusted exhaust gas E, which exits the apparatus through, for example, at least one exhaust channel 44. The combusted exhaust gas E can also be directed to pass in heat communication with other parts of the electrochemical generator (not shown), such as, for example, with the walls of the reformation chamber 48 and of the oxidation chamber 50, prior to exiting the generator to provide the reformation chamber 48 and/or the oxidation chamber 50 with a heat source. The combusted exhaust channels 44 can be made of a high temperature resistant metal such as Inconel.

Further during operation, a fresh gaseous hydrocarbon feed fuel F that has not yet been reformed, such as, for example a gaseous hydrocarbon, including hydrocarbon such as methane ($CH_4$), ethane ($C_2H_6$), propane ($C_3H_8$), and the like, vaporized petroleum fractions such as naphtha, and alcohols, such as ethyl alcohol ($C_2H_5OH$), and the like, a natural gas, that is, a mixture of 85% methane, 10% ethane and a balance of propane, butane, and nitrogen, can be used. These reformable fuel mediums F are fed into the generator 10 through the fresh hydrogen feed fuel inlet 34 and conditioned in a reformation chamber 48, and are then passed as conditioned fuel CF into the generator chamber 28 through generator entry ports 42 in order to provide the fuel source which is to be converted to direct current electrical energy in the generator.

A major portion of the hot gaseous spent fuel $SF_2$ formed along the axial length of the electrochemical cells during the electrochemical reactions is directed to flow to at least one spent fuel recirculation channel 46 and accordingly directed not to pass through the porous barrier 40. The spent fuel recirculation channel can be made of a high temperature resistant metal such as Inconel. The spent fuel contains at least water vapor (steam) and carbon dioxide, and also some hydrogen and carbon monoxide. Another portion of the hot spent gaseous fuel $SF_1$ passes into the combustion chamber 30, as previously described, to combust with spent air or oxidant, and preheat the fresh oxidant feed.

The spent fuel recirculation channel 46 containing a portion of the spent fuel $SF_2$ passes from the generator chamber 28 and is split into at least two streams, $SF_2'$ and $SF_2''$, the first stream spent fuel gas $SF_2'$ feeding through an inlet 58 into at least one Fe/FeO oxidation bed 50 containing mostly iron metal (Fe) for conditioned fuel generation and reforming catalyst regeneration, wherein Fe is oxidized to FeO and fuel products for the electrochemical generator, such as CO and $H_2$, and the second stream of spent fuel $SF_2''$ combining with the fresh feed fuel F, such as natural gas, at a mixer 60, which is preferably positioned in a cooler region of the insulation, and the mixture feeding through an inlet 62 into at least one Fe/FeO reformation bed 48 containing mostly iron oxide (FeO) for conditioned fuel generation, wherein FeO is reduced by a hydrocarbon reformation reaction to Fe and fuel products for the electrochemical generator, such as CO and $H_2$. It should be understood that a plurality of oxidizer beds 50 and reformer beds 48 can be connected and operated in series or in parallel.

Once the at least one oxidation bed 50 is exhausted by substantially complete oxidation of Fe to FeO, and once the at least one reformation bed 48 is exhausted by substantially complete reduction of FeO to Fe, each of the beds can be switched over in function by control means, such as valves being shown as V or the like, to become the reformation bed 48 and the oxidation bed 50, respectively. The fuel products such as CO and $H_2$ being shown as CF produced from either the oxidation bed 50 or the reformation bed 48, then can pass from the oxidation bed outlet 64 and the reformation bed outlet 66 through a series of ports 42 which connect the oxidation chamber 50 and reformation chamber 48 to the generator chamber 28, and be allowed to flow into the generator 28 and pass over the fuel electrodes 18 as the conditioned fuel CF for electrochemical reactions. Blowers 68 or the like can also be used to facilitate gas circulation into the generator chamber. The oxidation chamber 50 and the reformation chamber 48 are further thermally coupled with a heat source (not shown) from either the arrangement generator components and channels or an external means in order to provide the thermodynamically feasible operating conditions for oxidation of Fe to FeO and reduction of FeO to Fe.

In operation, the oxidant which is fed within the electrochemical cell is electrochemically reduced at the air electrode-electrolyte interface according to the reaction: $O_2 + 4e^- \leftrightarrows 2O^{2-}$ (air electrode). The electrons for the oxidant reduction are supplied by the air electrode. Moreover, the oxygen ions formed by this electrochemical reaction become a part of the solid electrolyte crystal structure and migrate through the solid electrolyte crystal to the electrolyte-fuel electrode interface where the fuel is fed over the outside of the electrochemical cell and is electrochemically oxidized at the electrolyte-fuel electrode interface according to the reaction: $H_2 + O^{2-} \leftrightarrows H_2O + 2e^-$ (fuel electrode) and/or $CO + O^{2-} \leftrightarrows CO_2 + 2e^-$ (fuel electrode). These reactions are for where either $H_2$ or CO is used as a fuel to the fuel cells. The oxidized fuel produced is carried away and electrons are released which then flow through an external load circuit to the air electrode, thus generating a flow of electrical current. The electrochemical reaction of oxygen with the fuel thus produces a potential difference across the external load which maintains a continuous electron and oxygen ion flow in a closed circuit and useful power can be derived. A more complete description of the operation of this type of electrochemical cell can be found in U.S. Pat. No. Re. 28,792 (Ruka), herein incorporated by reference in its entirety.

Switching the electrochemical conditioned fuel supply from one reformation bed to the other oxidation bed allows for continuous hydrocarbon reformation and also for a continuous fuel supply to the electrochemical cell. In addition, this "swing-bed reformation" with alternating Fe/FeO oxidation beds and Fe/FeO reformation beds is claimed to be less susceptible to loss of reformation capability due to catalyst deactivation compared to conventional electrochemical cells having internal reformers, even though all oxygen species necessary for the reformation reaction ultimately stems from the spent fuel products during fuel cell generator operation. The Fe/FeO oxidation beds, therefore, act as oxygen storage devices before they are switched over to the function of reformation beds, where they loose the oxygen to the reformation reaction with fresh hydrocarbons.

More particularly, in the invention, the continuous supply of conditioned fuel, such as CO and $H_2$ for the fuel cells is supplied by at least two Fe/FeO packed beds being used in alternating modes, i.e., 1. an oxidation mode; and, 2. a reformation mode, wherein the beds are interchanged in function when each individually becomes substantially exhausted. Therefore, the spent fuel comprising at least $H_2O$ vapor (steam) and $CO_2$, and also typically further comprising $H_2$ and CO from the electrochemical cell operation is used in one instance to convert iron metal to iron oxide and fuel gas, such as CO and $H_2$, in one of the Fe/FeO beds and, in the other instance, the iron oxide is combined with hydrocarbons, such as, for example natural gas, which in most parts comprises methane, in another of the Fe/FeO beds, and optionally is further combined with spent fuel gas, to convert iron oxide to iron metal and fuel gas, such as CO and $H_2$, for the fuel cells. The at least two beds, at least one oxidation bed and at least one reformation bed, are preferably operated concurrently, but alternating their respective functions periodically from one to the other although other types of operation are not excluded.

The oxidation and reformation beds are mechanically structured identically and may consist of packed granular beds or be in tubular, annular, planar or the like forms. The granules of iron or iron oxide can be configured in various shapes, such as irregular lumps, spherical, oblate spheroid, annular ("Raschig rings"), wagon wheel or the like. The reformation bed and oxidation bed size can be varied in wide margins and is governed by generator size and other operational considerations. Smaller beds must be switched-over more frequently from reformation to oxidation during operation but can be integrated thermally into a generator more easily. Larger beds may be more appropriate for separate installation but yet thermally integrated with difficulty into the fuel cell generator. However, larger beds would allow for better control and ease of servicing. The pellet size, shape, strength, porosity, packing density are important parameters for effective operation in terms of size, structural, thermal and pressure drop characteristics and can be determined by operational analysis.

An electrochemical generator apparatus 10 as described above is designed to operate with gaseous hydrocarbon fuels, such as natural gas comprising in most part methane ($CH_4$), which provides the useful fuel for oxidation and release of electrons for electrical power generation. The reason for fuel conditioning operations and the need for fuel conditioning devices such as the reformation bed and oxidation bed of the invention is because the direct use of hydrocarbon fuels is undesirable for generating electrical power since hydrocarbon cracking can occur which forms carbon deposits on the generator components. Deposition of carbon on the electrochemical generator components, for example, insulation boards, fuel distribution boards, support blocks, partition boards and electrochemical cells, reduces the efficiency of electrochemical generator, inter alia, by blocking transport pass, providing electrical short-circuits, reducing insulation effects, and deactivation and destroying reforming catalysts. Thus, it becomes desirable to reform or condition the hydrocarbon fuels to CO and $H_2$ prior to entering the generator chamber through the use of a reforming catalyst according to the scheme of the invention. The reformed hydrocarbon fuel is then combined in the electrochemical generator along with the oxidant to produce electric energy and heat. The reformation reaction is endothermic and, therefore, requires a supply of heat. The oxidation reaction also requires a supply of heat. Therefore, both reformation and oxidation beds are preferably thermally integrated with the generator to use sensible heat produced during generation operations.

The reformation of hydrocarbons, thus, is an important step in the field of fuel conditioning for electrochemical cells, such as fuels for high temperature, solid oxide electrolyte fuel cells. In the invention, a novel approach to hydrocarbon reformation and fuel production is provided by using iron metal/iron oxide beds which can serve as a transfer agent of oxygen for the reformation reactions and also provide a continuous supply of fuel to the electrochemical generator. To recap, in at least one of the iron metal/iron oxide beds, i.e., the oxidation bed, spent fuel gases containing $H_2O$ (steam) and $CO_2$ are used to form FeO and thereby reactivate the reforming catalyst and simultaneously produce CO and $H_2$ fuel by the oxidation of the iron metal in the presence of the spent fuel gas and in at least one other of the iron metal/iron oxide beds, i.e., the reformation bed, a hydrocarbon feed fuel, such as natural gas which in most part comprises methane, is reformed on iron oxide to produce iron metal and CO and $H_2$ fuel by the reduction of the iron oxide. The hydrocarbon feed fuel for reformation is optionally further combined with spent fuel from the electrochemical generator operation to provide additional oxygen species such that hydrocarbon cracking under the catalytic influence of formed iron metal during reformation can be avoided.

Switching the electrochemical generator fuel supply from one bed to the other allows for a continuous hydrocarbon reformation and fuel supply to the electrochemical generator from both beds. Moreover, when each of the different beds are exhausted, one by oxidation of Fe to FeO and one by reduction of FeO to Fe, they are switched over in function by control means, whereby the exhausted FeO bed becomes the reformer bed and the exhausted Fe bed becomes the oxidation bed. The constant phase transformation from iron metal to iron oxide during oxidation and the reverse reaction from iron oxide to iron metal during natural gas reformation, reactivates the iron metal/iron oxide to a reactive form and, therefore, deactivation and poisoning of the reformation catalyst, which is a life limiting parameter for conventional catalysts, is avoided.

Figure 2:
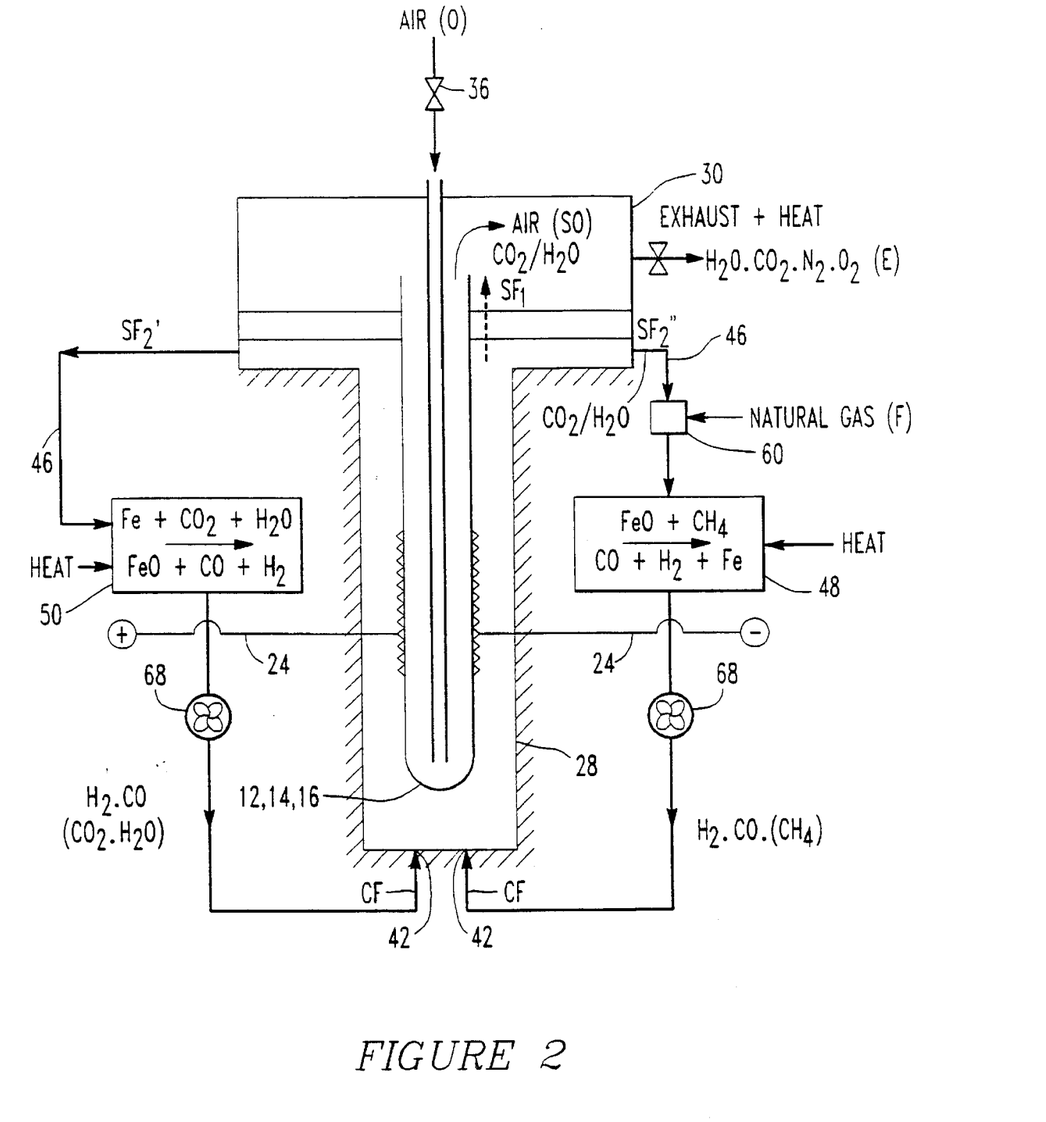
FIG. 2 is a schematic of the swing-bed reformation process of the invention.

Referring now to FIG. 2, a schematic of the "switch-bed reformation" method of the invention is provided. As shown in FIG. 2, at least two iron/iron oxide beds are provided to produce the fuel for the electrochemical reactions. At least one of the Fe/FeO bed, the oxidation bed 50, provides for the oxidation of iron metal (Fe) to iron oxide (FeO) in the presence of spent fuel gas $SF_2'$, rich in carbon dioxide and water vapor, to produce carbon monoxide and hydrogen fuel for the electrochemical reaction. The oxidation reactions in the Fe/FeO oxidation bed are generally according to the following Equations (2), (3) and (4), but not necessarily in the indicated molecular ratios:

$$Fe+H_2O \leftrightharpoons H_2+FeO \tag{2}$$

$$Fe+CO_2 \leftrightharpoons CO+FeO \tag{3}$$

and, $$2Fe+CO_2+H_2O \leftrightharpoons 2FeO+CO+H_2 \tag{4}$$

At least one other Fe/FeO bed, the reformation bed 48, provides for reduction of iron oxide to iron metal in the presence of hydrocarbon gas, such as natural gas, which is reformed to fuel gas such as CO and $H_2$ having the oxygen species for reformation provided, mainly by the iron oxide bed. Additionally, some spent fuel gas $SF_2''$, rich in carbon dioxide and water vapor can be used in the mixture with the natural gas to achieve an oxygen to carbon ratio (O:C) in the feed gas to the Fe/FeO bed that prevents the deposition of solid carbon under the catalytic influence of the formed iron in the Fe/FeO bed. The reformation reactions in the Fe/FeO reformation bed 48 are generally according to the following Equations (5), (6) and (7), but not necessarily in the indicated molecular ratios:

$$FeO+CH_4 \leftrightharpoons Fe+CO+H_2 \tag{5}$$

$$CH_4+H_2O \leftrightharpoons CO+3H_2 \tag{6}$$

and, $$CH_4+CO_2 \leftrightharpoons 2CO+2H_2 \tag{7}$$

The oxidation bed 50 and reformation bed 48 are alternately used to provide a continuous supply of feed fuel such as CO and $H_2$ for the electrochemical cell. According to a preferred embodiment, in the first mode of "swing-bed reformation", the spent fuel, rich in water vapor and carbon dioxide and also may contain hydrogen and carbon monoxide, will be directed in at least one of the spent recirculation channels 46 to combine with a fresh hydrocarbon feed fuel F, such as natural gas, at a mixing apparatus 60, such as an ejector, jet pump, nozzle, aspirator, mixture-nozzles/mixer-diffuser, blower or the like. The mixing apparatus is preferably positioned in the cooler region of the insulation material to reduce hydrocarbon cracking at the mixing apparatus. The mixture of the spent fuel with the natural gas allows for the attainment of an oxygen to carbon ratio (O:C) that is sufficient to prevent hydrocarbon cracking. Preferably, the volume ratio of this spent fuel to the fresh fuel feed will be adjusted in the mixing apparatus so that approximately a volume ratio of O:C is from about 1.2:1 to 3:1 for a natural gas fueled electrochemical cell generator.

The presence of additional oxygen species such as water vapor and/or carbon dioxide in addition to a reforming catalyst such as iron oxide in the Fe/FeO reformation bed 48, allows for the reformation of gaseous hydrocarbons to CO and $H_2$ and further reduces the rate of carbon deposition due to hydrocarbon cracking. This reformable fuel mixture is passed through the Fe/FeO reformer bed 48 in the oxidized iron oxide (FeO) condition such that natural gas will be reformed to CO and $H_2$ and whereby iron oxide will be reduced to iron metal. The reformable gas fuel mixture is thus reformed into a relatively low carbonizing conditioned fuel CF, and exits the reforming chamber 48 into the generator chamber 28 through generator entry ports 42, as shown. While the FeO in the reformation bed 48 is being reduced, the other Fe/FeO oxidation bed 50 is actively oxidized and produces CO and $H_2$ fuel. Once the iron oxide of the FeO/Fe reformation bed is depleted of oxygen species for the reformation reaction, the flow of the natural gas feed fuel and the spent recirculation fuel supply is stopped to the reformation bed, which is switched over to the other bed which becomes now the reformation bed. The previous reformer bed in turn becomes the oxidation bed. Both beds are active simultaneously and both provide fuel to the SOFC generator simultaneously.

The "swing-bed reformation" with alternating Fe/FeO beds, thus, provides a unique method to provide a continuous supply of fuel for the electrochemical reaction while also providing a continuous source of oxygen species for the reformation reaction and continual regeneration of the reforming catalyst.

Figure 3:
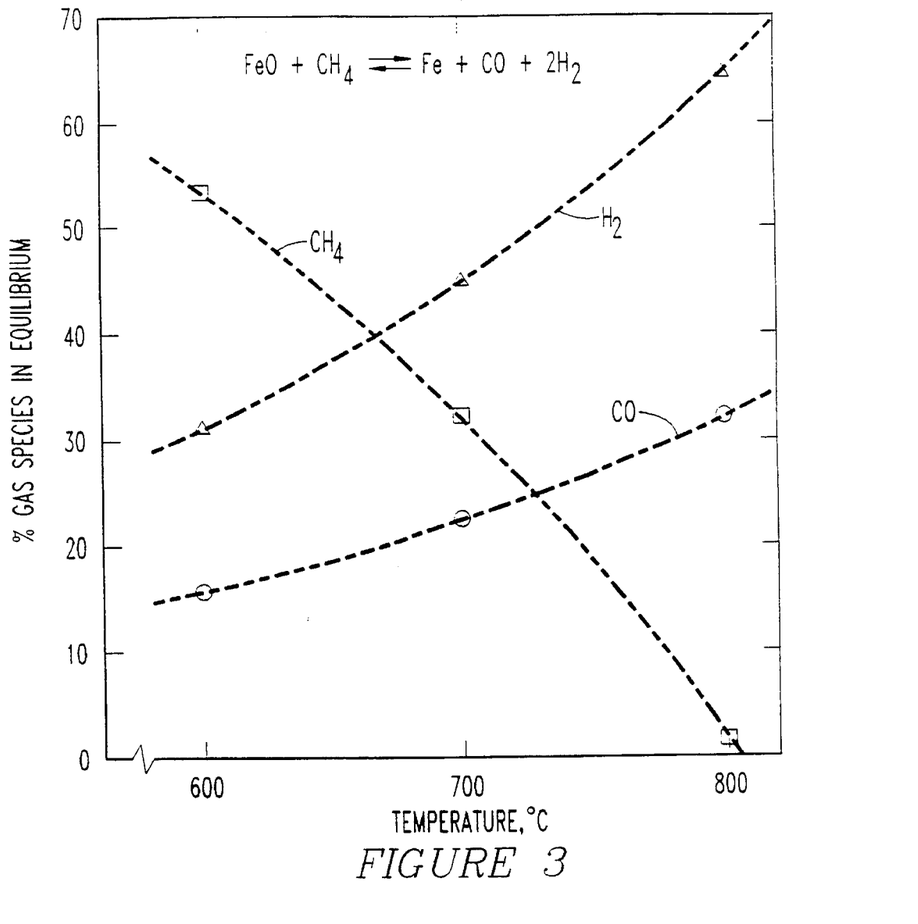
FIG. 3 is a diagram of the thermodynamic feasibility between 600°–800° C. of hydrocarbon reformation on iron oxide to iron and conditioned fuel gas, such as CO and $H_2$.

FIG. 3 shows the thermodynamic feasibility at equilibrium of reformation of methane, which is a major component of natural gas, on FeO. While this reaction is not the sole reformation reaction in the reformer (recirculated spent fuel gases are added), FIG. 3 shows that this partial reaction is thermodynamically feasible and it produces practical quantities of hydrogen and carbon monoxide in a temperature range of about 600° to 800° C. Fe/FeO reformation bed temperatures between about 600° to 800° C. are quite acceptable for practical operation in a electrochemical fuel cell generator such as a high temperature, solid oxide electrolyte fuel cell (SOFC) generators.

Figure 4:
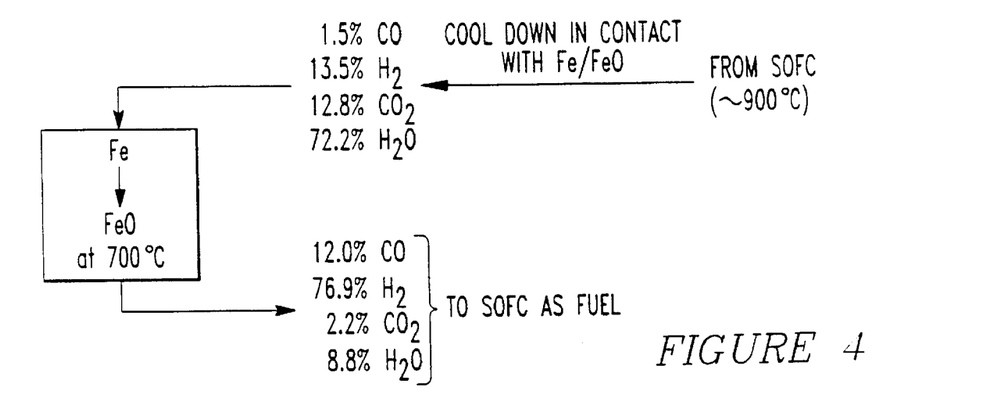
FIG. 4 is a diagram of the thermodynamic feasibility at 700° C. of iron oxidation to iron oxide, with spent fuel gas compositions containing mostly $H_2O$ and $CO_2$ leading to fuel gas containing mostly $H_2$ and CO.

In addition, FIG. 4 shows the thermodynamic feasibility of oxidizing iron to iron oxide with spent fuel gases and producing an equivalent amount of fuel gas for the electrochemical reaction. For example, recirculation of a spent fuel gas composition when reacted with iron at 700° C. forms iron oxide in an acceptable level of fuel. The reaction yields a very acceptable fuel composition as shown in FIG. 4. Here, a recirculated spent gas composition was chosen as inlet gas to the Fe/FeO bed that is equivalent to a fuel gas utilization in an SOFC generator of 85%. This gas, when reacted with the iron at 700° C., forms iron oxide and about 89% fuel, CO and $H_2$. This is a very acceptable fuel composition, however, fuel compositions will typically not be as rich as calculated because thermodynamic equilibrium will not be achieved under dynamic system conditions as well as at different degrees of bed reactants. It is recognized that an operational analysis is required to determine the practical rate limitations, but iron oxidation reaction poses no obstacle to the "swing bed-reformation", especially of natural gas.

The invention disclosure incorporates by reference all of the hereinabove mentioned U.S. patents in their entireties.

The invention having been disclosed in connection with the foregoing variations and examples, additional variations and examples will now be apparent to persons skilled in the art. The invention is not intended to be limited to the variations and examples specifically mentioned, and accordingly reference should be made to the appended claims rather than the foregoing discussion of preferred examples, to assess the spirit and scope of the invention in which exclusive rights are claimed.

I claim:

1. An electrochemical fuel cell generator apparatus, comprising:

a generator chamber containing at least one fuel cell bundle, the bundle containing a plurality of parallel, elongated electrochemical fuel cells, each cell including an exterior fuel electrode, an interior air electrode, and a solid oxide electrolyte disposed between the fuel electrode and the air electrode;

an oxidant gas inlet connected to the interior of the fuel cells;

a fuel gas inlet connected to the generator chamber and to the exterior of the fuel cells;

a combustion chamber connected to the generator chamber for combusting a spent oxidant and a portion of spent fuel gas exiting from the generator chamber;

at least one exhaust gas channel connected to the combustion chamber for passing hot combusted exhaust gas exiting from the combustion chamber;

at least one spent fuel gas recirculation channel connected to the generator chamber for recirculating a second portion of the spent fuel gas exiting from the generator chamber;

at least one reforming chamber connected to the generator chamber, said at least one reforming chamber including an iron oxide bed, heating means for said iron oxide bed, inlet means for introducing a fresh hydrocarbon gas over said iron oxide bed, and a fuel gas outlet channel from the at least one reforming chamber connected to the fuel gas inlet to the generator chamber;

a fresh hydrocarbon gas inlet connected to the reforming chamber;

a mixing chamber connected to the fresh hydrocarbon gas inlet and the spent fuel gas recirculation channel for combining a portion of the spent fuel gas containing water vapor and carbon dioxide in the spent fuel gas recirculation channel with a fresh hydrocarbon feed gas prior to entering the reforming chamber;

at least one reforming catalyst regeneration chamber connected to the generator, said at least one reforming catalyst regeneration chamber including an iron metal bed, heating means for said iron metal bed, and a fuel gas outlet channel from the at least one reforming catalyst regeneration chamber connected to the fuel gas inlet to the generator chamber;

a spent fuel inlet channel connected to the reforming catalyst regeneration chamber for introducing a portion of the spent fuel gas containing water vapor and carbon dioxide in the spent fuel recirculation channel to the reforming catalyst regeneration chamber;

control means connected to the at least one reforming chamber and the at least one reforming catalyst regeneration chamber, said control means interchanging, one for the other, the at least one reforming chamber and the at least one reforming catalyst regeneration chamber upon exhaustion of the iron oxide reforming catalyst bed and the iron metal bed in each chamber, respectively, to continuously reform a hydrocarbon gas and supply a fuel gas to an electrochemical generator fuel cell for electrochemical conversion to electrical energy.

2. The apparatus of claim 1, wherein the chambers are within a metal housing lined with insulation.

3. The apparatus of claim 1, wherein the electrochemical cells are fuel cells, the air electrode is doped lanthanum manganite, the solid oxide electrolyte is yttria stabilized zirconia, and the fuel electrode is nickel-zirconia cermet.

4. The apparatus of claim 1, wherein the fresh hydrocarbon gas is natural gas comprising methane.

5. The apparatus of claim 1, wherein the at least one reforming chamber is heated by the heating means to a temperature of about 600° C. to 800° C. and the at least one reforming catalyst regeneration chamber is heated by the heating means to a temperature of about 600° C. to 800° C.

6. A method of conditioning a fuel gas for electrochemical conversion to electrical energy in an electrochemical cell, comprising:

a) providing a supply of a hydrocarbon gas;

b) passing said hydrocarbon gas in contact with at least one iron oxide reforming catalyst at a temperature of about 500° C. to 900° C. for an effective time to substantially reduce all of the iron oxide to iron metal to define an exhausted iron oxide reforming catalyst and to produce fuel gas containing $H_2$ and CO as fuel for an electrochemical cell;

c) providing a supply of oxidizing gas containing $H_2O$ (steam) and $CO_2$;

d) passing said oxidizing gas in contact with at least one other iron oxide reforming catalyst in an exhausted condition at a temperature of about 500° to 900° C. for an effective time to substantially oxidize all of the iron metal to an iron oxide to define a reactivated iron oxide reforming catalyst and to produce fuel gas containing $H_2$ and CO as fuel for an electrochemical cell;

e) repeating the preceding steps (a) to (d) while interchanging the position of reactivated iron oxide reforming catalyst with the exhausted iron oxide reforming catalyst.

* * * * *